US005600136A

United States Patent [19]

Hablanian et al.

[11] Patent Number: 5,600,136

[45] Date of Patent: Feb. 4, 1997

[54] SINGLE POTENTIAL ION SOURCE

[75] Inventors: Marsbed Hablanian, Wellesley, Mass.; Asoka Ratnam, Rockville, Md.

[73] Assignee: Varian Associates, Inc., Palo Alto, Calif.

[21] Appl. No.: 474,593

[22] Filed: Jun. 7, 1995

[51] Int. Cl.[6] .......................... B01D 59/44; H01J 49/00; H01J 27/00

[52] U.S. Cl. ...................... 250/288; 250/423 R; 250/427

[58] Field of Search ............................ 250/423 R, 427, 250/288; 313/359.1; 315/111.81

[56] References Cited

U.S. PATENT DOCUMENTS

| | | | |
|---|---|---|---|
| 3,277,295 | 10/1966 | Briggs | 250/41.9 |
| 4,691,109 | 9/1987 | Magee et al. | 250/423 R |
| 4,697,085 | 9/1987 | Magee et al. | 250/423 R |
| 5,153,432 | 10/1992 | Devant et al. | 250/292 |
| 5,432,342 | 7/1995 | Nishimura et al. | 250/251 |
| 5,451,781 | 9/1995 | Dietrich et al. | 250/291 |

*Primary Examiner*—Bruce C. Anderson

*Attorney, Agent, or Firm*—Kurt M. Maschoff; Bella Fishman

[57] ABSTRACT

A single potential ion source includes a single conical electrode encircled by a cylindrical magnet. At least one filament is placed proximate to the electrode. This arrangement serves to accelerate electrons created by energy from the filament toward a center axis of the conical electrode. The electrons collide with gas particles to create a focused ion stream. The stream may be directed into a magnetic field in a mass spectrometer tube.

20 Claims, 3 Drawing Sheets

SINGLE POTENTIAL ION SOURCE

BACKGROUND OF THE INVENTION

The present invention relates to ion sources such as those used in, e.g., mass spectrometers. In particular, the present invention relates to an ion source which operates using only a single potential.

Mass spectrometers are known in the art, and may be used to measure the presence of a selected gas in a system. A central component of a typical mass spectrometer is the ion source. Gas entering the mass spectrometer flows into the ion source. Electrons, produced typically by a hot filament, enter an ion chamber and collide with the gas molecules. This creates an environment within the chamber where ions are quantitatively proportional to the pressure in the ion chamber. Ions are withdrawn from the ionization chamber through an exit hole or slit under the influence of an electrostatic field created by a voltage potential applied at a withdrawal electrode. The ions are further guided by one or more focus plates which also produce a field created by further voltage potentials. The various voltage potentials creating the ion beam and the focus fields are chosen to ensure that a straight ribbon of ions exits from the chamber.

The ions from the chamber typically enter a magnetic field which deflects ions in proportion to their mass-to-charge ratio. In magnetic bending types of helium mass spectrometer leak detection systems, the magnetic field is typically adjusted so hydrogen ions are deflected 135°, helium ions 90°, and all heavier species less than 90°. An ion collector is placed at 90° to collect the target particles, i.e., helium ions. All other ions are deflected away from the collector. The collector current is then measured by an amplifier for evaluation.

In these previous systems, the ion source required the application of a number of voltages to create necessary electron trajectories and to withdraw and collimate a stream of ions for delivery through the magnetic field. Most previous systems required at least four or five different voltage sources to accomplish this. This is undesirable for several reasons. When these voltages are varied to obtain the desired helium ion beam current and shape they tend to interact and thus require a series of iterative adjustments which makes an automatic tuning more difficult. The iterations required makes the adjustment procedure rather lengthy. Further, construction, design, and coupling of ion sources requiring several potentials is difficult. With increased complexity comes reduced reliability and increased cost.

Another disadvantage of existing ion sources is that they have a limited useful life. The life of the source is only as good as the life of the electron emitting filament used in the system. Although certain existing systems use redundant filaments (i.e., a spare is typically placed opposite or beside the primary filament for use when the primary expires), the life of the ion source is still limited. Once both filaments have expired, the ion source is rendered useless until the source can be retrofitted with new filament(s).

Accordingly, an ion source for a mass spectrometer leak detection system is needed which is easily tuned, simple in design, low in cost, and long in life. Further, it would be desirable to provide an ion source which supports automatic tuning.

SUMMARY OF THE INVENTION

According to the invention, a single potential ion source includes a single conical electrode encircled by a cylindrical magnet. At least one filament is placed proximate to the electrode. This arrangement serves to accelerate electrons toward a center axis of the conical electrode. The electrons collide with gas particles to create a focused ion stream. The ion stream may be directed into a magnetic field in a mass spectrometer tube.

The symmetry of ion sources of the present invention allows the use of two or more redundant filaments, thereby extending the life of the ion source. The ion source may be readily tuned by varying the voltage applied to the single electrode. Further, different characteristics and peaks may be achieved by changing the geometry of the electrode. For example, a larger conical electrode may be used to focus the ion stream at a greater distance.

The ion source of the present invention may be used in existing mass spectrometer tubes as it may be constructed on any conventional multi-pin vacuum tube feedthrough. Other shapes and sizes may be implemented by appropriate scaling of the basic elements of the present invention.

For a fuller understanding of the nature and advantages of the invention, reference should be made to the ensuing description taken in conjunction with the accompanying drawings.

DESCRIPTION OF THE PREFERRED EMBODIMENT

Figure 1:
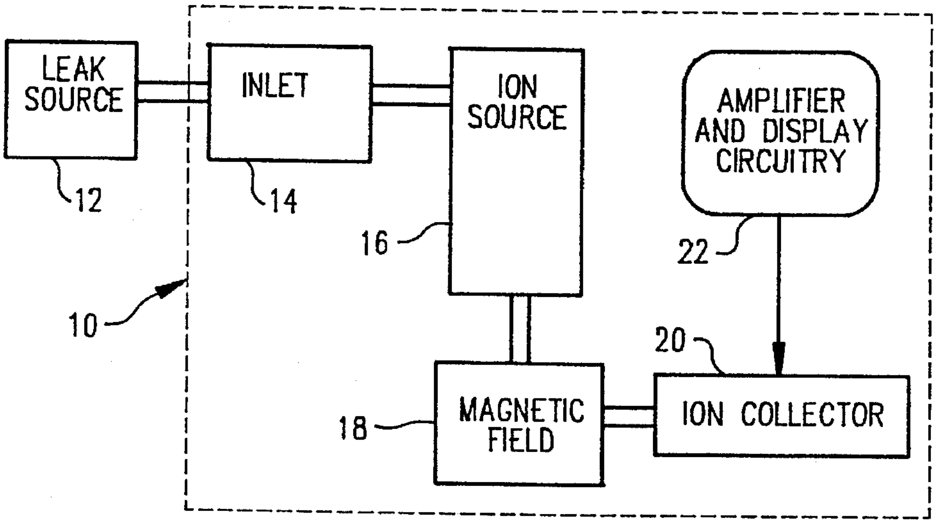
FIG. 1 is a block diagram depicting components of a mass spectrometer leak detection system.

Referring now to FIG. 1, a block diagram depicting a mass spectrometer 10 for use, e.g., in a leak detection system is shown. The system is shown in block form since such systems are generally known in the art. These systems are designed to detect the presence of a probe gas, typically helium, in a leak source 12. Gases present in the leak source 12 are received in an inlet 14 of the mass spectrometer 10 and are carried into an ion source 16. The ion source 16 creates ions quantitatively proportional to the gas pressure within the ion source. The ions are directed to a magnetic field 18 which is designed and adjusted so that only helium ions are deflected to an ion collector 20 for subsequent measurement using, e.g., amplifier and display circuitry 22. A central component of the system is the ion source 16.

Figure 2:
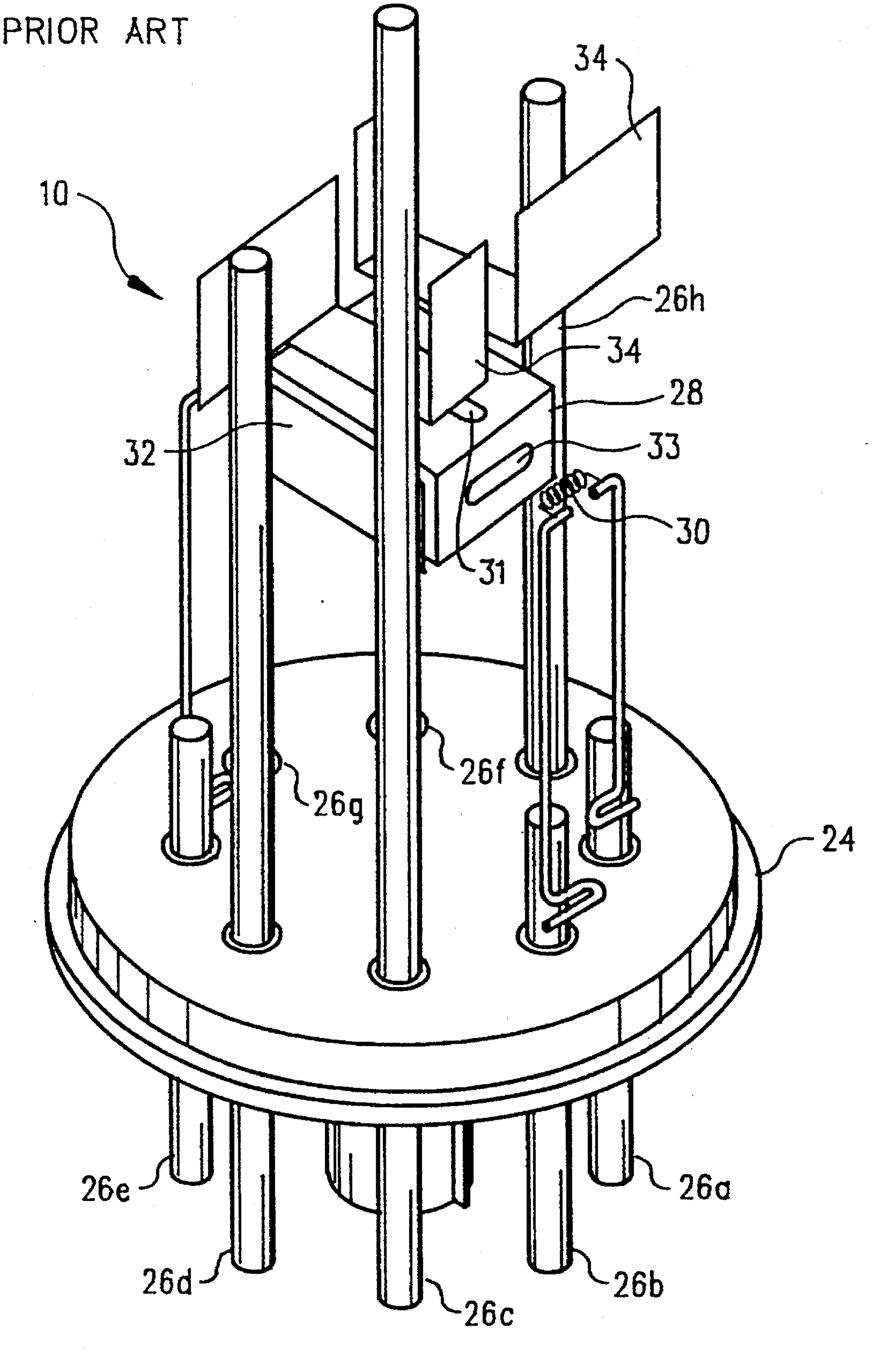
FIG. 2 PRIOR ART
FIG. 2 is a perspective view of a prior art ion source.

Referring now to FIG. 2, a prior art ion source 16 is shown. Typically, ion source 16 is supported on a demountable vacuum closure 24 for insertion and removal into an opening in a mass spectrometer tube. The closure 24 contains a conventional multi-pin vacuum tube feedthrough. A number of the pins 26*a–h* may be used to electrically couple and/or support elements of the ion source 16.

The ion source 16 includes an ion chamber electrode 28 which is open to the flow of gas from an inlet opening of the mass spectrometer. The ion chamber electrode 28 has an ion exit slit 31 and left and right openings 33 for the admission of electrons. A thermionic filament 30 is used to produce electrons which enter the ion chamber through opening 33 and collide with gas molecules. This creates a number of ions in the chamber quantitatively proportional to the pressure in the ion source. These ions are typically repelled out of the ion source through the exit slit 31 by a repeller field created by one or more repeller electrodes 32. Focus plates 34 may be used to aim or steer the stream of ions into the magnetic field 18 in the next stage of the mass spectrometer system. The combined electrostatic effect of the repeller electrode or electrodes, ion chamber electrode, and focus plates colliminate the ion beam so that it enters the magnetic field as a straight ribbon of ions.

Sensitivity and reliability of the mass spectrometer requires that the ion source function efficiently and correctly. Ensuring that the ion source is properly adjusted, however, can become a problem when a number of different potentials are required to operate the source. In the ion source of FIG. 2, four different potentials are needed. The repeller electrode, the ion chamber electrode, and the focus plates each require a separate potential. Other ion sources require application of an even greater number of potentials. When these voltages are varied to obtain the desired helium beam current and shape, they tend to interact and thus require a few iterative adjustments which makes an automatic tuning more difficult and the procedure becomes rather lengthy.

Previous ion sources also require proper positioning and placement of electrodes. This becomes more complex as a greater number of precisely positioned electrodes becomes necessary. If any of the electrodes are improperly focused or positioned, the ion stream created by the ion source may lose focus. The problem of placement is exacerbated by the use of thin sheets of bendable metal for electrodes. Improper handling and installation of these electrodes can result in loss of precision.

Certain prior ion sources utilized dual-redundant filaments to extend the useful life of the source. The second filament was placed on the opposite side of the chamber from the primary filament. Other configurations were generally impractical, as other placements of the redundant filament required substantial retuning or adjustments to the ion source.

Figure 3:
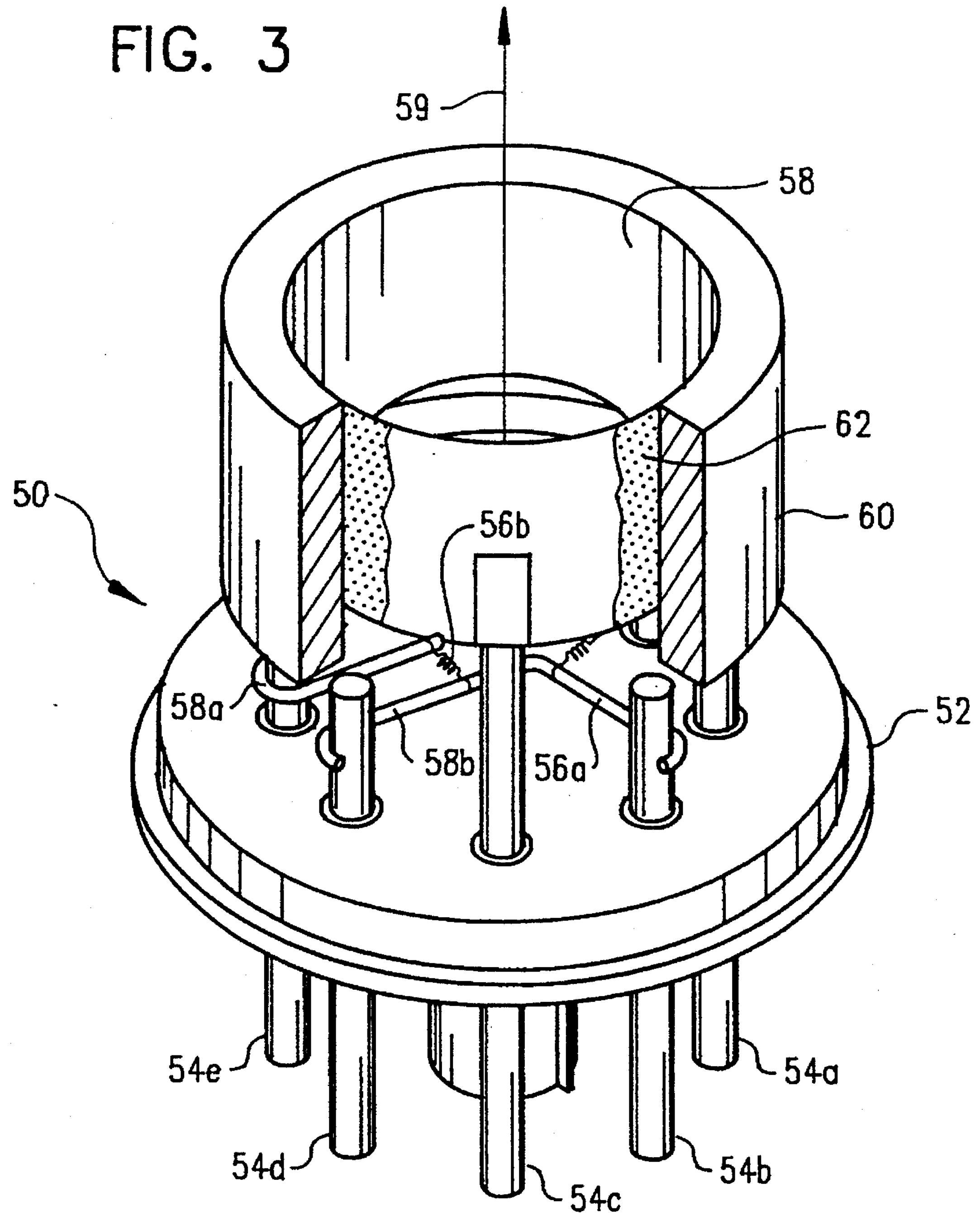
FIG. 3 is a perspective, partial cut-away view of a single potential ion source according to one embodiment of the present invention.

Referring now to FIG. 3, one specific embodiment of an ion source 50 according to the present invention is shown. The ion source 50 may be shaped to fit into vacuum tube feedthrough designed to accommodate existing ion sources. The ion source 50 is supported on a standard vacuum tube feedthrough 52 having, e.g., eight pins 54*a–h*. One or more filaments 56 are coupled to pins 54 using wires 58 for support and electrical connection. In one specific embodiment, the filaments are heated using 5 Volts. Those skilled in the art realize, however, that the manner of heating the filaments 56 is not critical. Other voltages or approaches may also be employed so long as sufficient energy is present to create a cloud of electrons in the area of the filaments.

Rather than using a number of plates at different potentials to obtain a desired ion beam shape and current, the ion source 50 of the present invention utilizes a single conical electrode 58 coupled to a single potential source. The single conical electrode 58 may be coupled to, e.g., one or more pins 54 placed at a common potential. In one specific embodiment for use in helium leak detection, the conical electrode 58 is placed at 275–300 Volts while the base, or feedthrough, is at ground. Experimentation has shown that the conical shape of the electrode 58 serves to create an ion focus point some distance away from the center of the cone, e.g., 2" from the cone. The focus point may be modified by varying the angular shape of the conical electrode and the voltage applied. The conical electrode 58 may be formed as a single cast piece or may be formed from an appropriately bent sheet of metal. Further, the entire electrode need not be conical in shape. Embodiments having both a conical portion and a cylindrical portion may also be used so long as an appropriate stream of ions and electrons is created.

The conical electrode 58 is encircled by a cylindrical magnet 60 which serves to increase the length of electron paths passing near the conical electrode in a manner to ensure maximum ionization. The symmetrical shape of the electrode 58 and magnet 60 serve to create an ion path at the axis 59 of the ion source. That is, an electron cloud is created by the heated filaments 56 near the base of the conical electrode 58. The potential and shape of the conical electrode 58 serves to accelerate the electrons into gas molecules in the ion source 50, creating ions which travel at the axis 59 of the ion source, or through the center of the conical electrode 58.

The result is an effective ion source 50 which is simple to fabricate and control. Only one electrode placed at a single potential is needed. This potential may be readily adjusted to properly tune the ion source to a particular peak (e.g., helium or the like). Automatic tuning is accommodated by eliminating the need to iteratively adjust more than one electrode placed at different potentials. Further, the entire structure is more easily and cheaply manufactured. Less active feedthrough are required. Fewer wires and connections are used. In addition, there is no need to precisely position and orient a number of electrodes in the present design. Instead, a single electrode at a single potential is used. The geometry of the electrode may be optimized to accommodate different detection systems.

An insulative radiation shield or layer 62 may be placed between the magnet 60 and the conical electrode 58 to ensure the magnet 60 does not overheat. Those skilled in the art recognize that overheating of a magnet can impair the field created by the magnet.

Figure 4A:
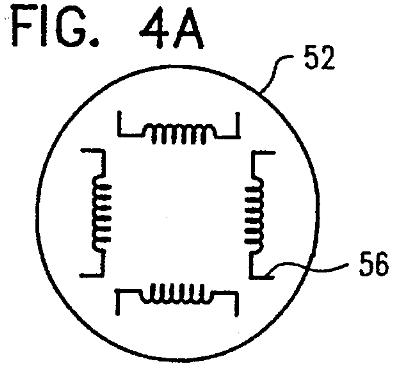
FIGS. 4A–D are top views of redundant filament arrangements for use in the single potential ion source of the present invention.
Figure 4B:
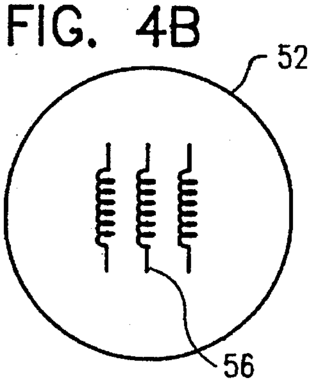
Figure 4C:
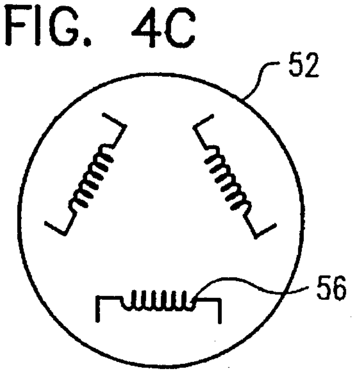
Figure 4D:
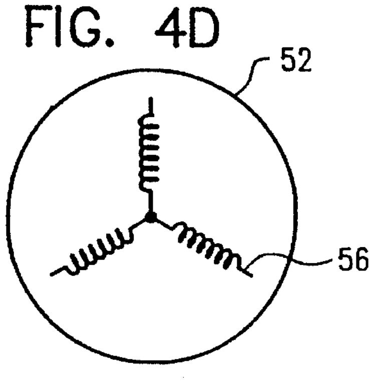

The symmetrical construction of ion sources 50 according to the present invention permits greater filament 56 redundancy, thereby extending the life of the ion source 50. For example, referring now to FIGS. 4A–D, a number of suitable filament placement schemes are shown. Three or more filaments 56 can be positioned at the base of the conical electrode 58. The primary requirement is that each filament 56 be coupled so that it may be separately activated. Further, the filaments 56 should be placed as closely together near the center of the conical electrode's axis 59 as possible. As the first filament burns out, a second filament may be activated. When the second filament burns out, the third or fourth filaments may be used. This can effectively increase the useful life of an ion source by over 30 to 50%. Square (FIG. 4A), parallel (FIG. 4B), delta (FIG. 4C), and y-shape (FIG. 4D) configurations are examples of possible filament arrangements.

Because the ion source 50 of the present invention is symmetrical, changes between appropriately placed filaments 56 do not have dramatic adverse effects on the tuning of the ion source. Any variance in performance of the source which occurs after switching to a backup filament may be compensated for by increasing or decreasing the single voltage. It has been found, however, that any performance variations are relatively minor if the filaments are positioned symmetrically. Those skilled in the art will recognize that any number of filament placements may be utilized in addition to those shown in FIG. 4.

As will be appreciated by those familiar with the art, the present invention may be embodied in other specific forms without departing from the spirit or essential characteristics thereof. For example, the relative sizings of the conical electrode 58 and the magnet 60 may be modified. It has been found that diameters which fit in existing ion source enclosures produce desirable results. However, larger or smaller diameters may also be used. Different pin numbers and placements may also be employed to further take advantage of the symmetrical shape of the ion source. Further, the conical shape and/or the voltage potential applied may be modified to achieve different ion focusing effects.

Accordingly, the disclosure of the invention is intended to be illustrative, but not limiting, of the scope of the invention which is set forth in the following claims.

What is claimed is:

1. An ion source in which a desired electron trajectory and a desired ion trajectory are both produced by a single electric potential, the ion source comprising:

an axisymmetrical electrode placed at said single potential;

a magnet encircling an exterior of said axisymmetrical electrode; and at least a first heating element positioned at a base of said axisymmetrical electrode;

wherein said desired ion trajectories are normal to said base of said axisymmetrical electrode.

2. The ion source of claim 1 further comprising at least a second and a third heating element positioned at said base of said axisymmetrical electrode.

3. The ion source of claim 1 wherein said desired ion trajectory is along a central axis of said axisymmetrical electrode away from said at least first heating element.

4. The ion source of claim 1 wherein said desired electron trajectory is towards said at least first heating element.

5. The ion source of claim 1 further comprising a thermal radiation shield positioned between said axisymmetrical electrode and said magnet.

6. The ion source of claim 1, wherein said axisymmetrical electrode is a conical electrode.

7. A single potential ion source for use in a leak detection system having an ion collector coupled to said ion source, the ion source comprising:

a base member;

a plurality of pins extending through said base member;

a conical electrode electrically coupled to at least one of said pins to be placed at said single potential, said electrode spaced apart from said base member;

a cylindrical magnet encircling an exterior of said conical electrode; and at least a first heating element coupled to at least two of said pins and positioned between said base member and said conical electrode; and said single potential chosen to direct ions away from said first heating element through a center portion of said conical electrode towards said ion collector.

8. The ion source of claim 7 further comprising:

at least a second heating element coupled to at least another of said pins and positioned between said base member and said conical electrode.

9. The ion source of claim 8 wherein said heating elements are filaments.

10. The ion source of claim 7 wherein said conical electrode is shaped to create an ion stream normal to said base member.

11. The ion source of claim 7 further comprising a thermal radiation shield positioned between said cylindrical magnet and said conical electrode.

12. An ion source for use in helium leak detection, comprising:

a conical electrode placed at a potential, said conical electrode having a central axis and a first and a second end;

a cylindrical magnet surrounding the exterior of said conical electrode; and at least a first filament positioned proximate said first end of said conical electrode;

said potential selected to direct a stream of ions along said central axis of said conical electrode away from said first end of said conical electrode.

13. The ion source of claim 12 wherein said conical electrode is shaped to focus a collimated ion stream approximately two inches from said second end of said conical electrode.

14. The ion source of claim 12 further comprising a first redundant filament and a second redundant filament positioned proximate said first end of said conical electrode.

15. The ion source of claim 14 wherein said at least first filament and said first and second redundant filaments are positioned side by side.

16. The ion source of claim 14 wherein said at least first filament and said first and second redundant filaments are positioned in a triangular arrangement.

17. The ion source of claim 14 wherein said at least first filament and said first and second redundant filaments are positioned in a star arrangement.

18. The ion source of claim 12 further comprising:

a demountable vacuum closure base positioned beneath said at least first filament; and a plurality of pins extending through said base, at least several of said pins coupled to one of said conical electrode or said at least first filament.

19. The ion source of claim 12 further comprising a thermally insulative shield positioned between said conical electrode and said cylindrical magnet.

20. An axi-symmetric ion source for use in a mass spectrometer leak detection system having an ion collector coupled to said ion source, the ion source comprising:

a base unit having a plurality of pins extending therethrough;

a conical electrode coupled to at least a first of said pins to receive a voltage, said conical electrode having a center axis, a first end, and a second end parallel said first end;

a cylindrical magnet positioned surrounding said conical electrode; and at least a first filament coupled to a second and a third of said pins;

said voltage selected to direct an ion stream along said center axis towards said ion collector.

* * * * *